United States Patent Office 3,423,135
Patented Jan. 21, 1969

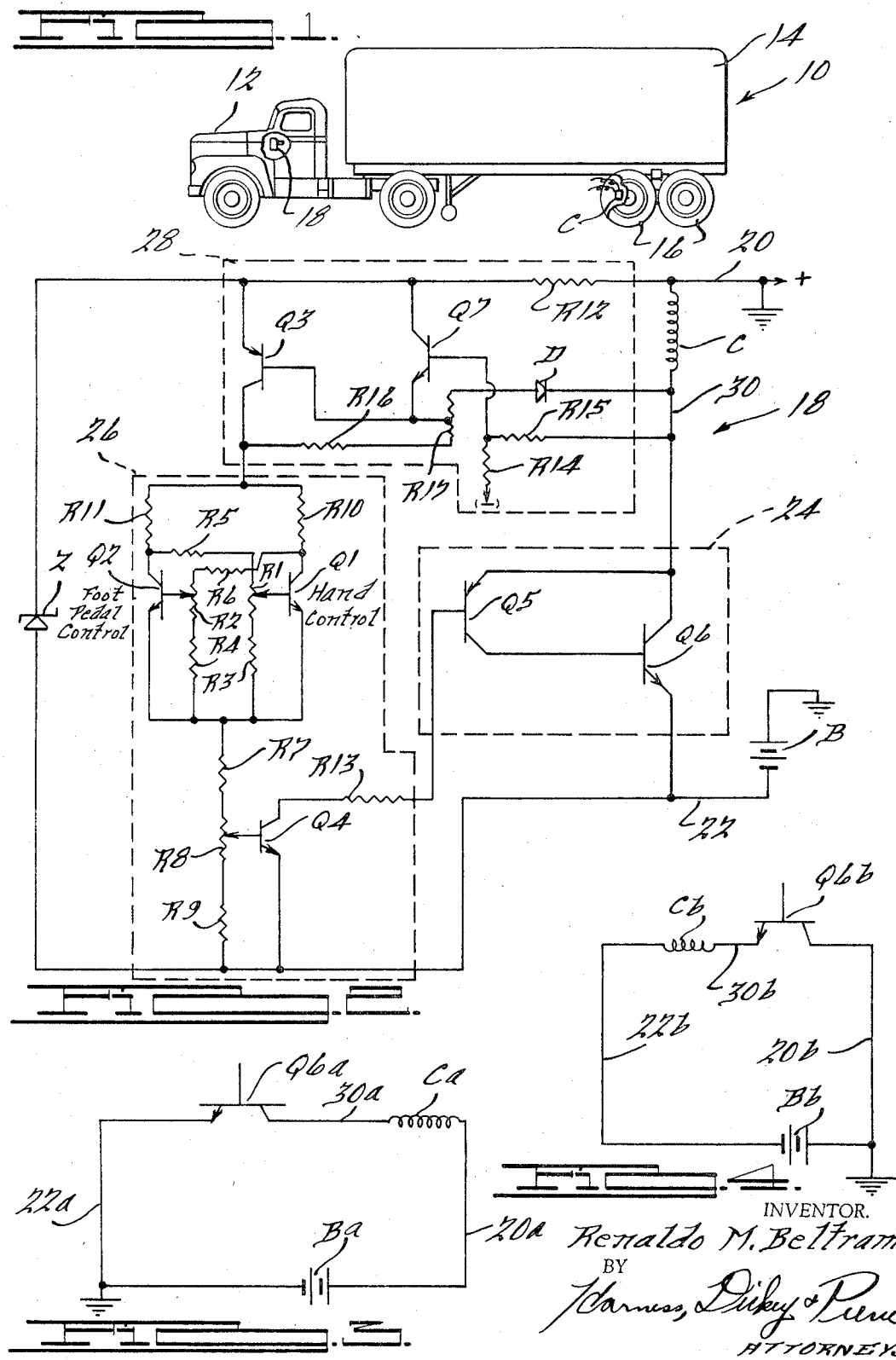

3,423,135
CONTROL SYSTEM FOR ELECTRIC BRAKES
Renaldo M. Beltramo, Royal Oak, Mich., assignor to Syncro Corporation, Oxford, Mich., a corporation of Michigan
Filed Oct. 20, 1966, Ser. No. 588,090
U.S. Cl. 303—3          31 Claims
Int. Cl. B60t *13/74, 13/68;* H01h *47/34*

ABSTRACT OF THE DISCLOSURE

A solid state control system for electric brakes in which the magnitude of the current to the brakes is controlled by an electrical control signal.

---

The present invention relates to control systems for electric brakes.

In a tractor trailer combination often the tractor is provided with a pneumatic or hydraulic brake system while the trailer is equipped with an electric brake system. In such a combination of braking systems, the electric brakes are operated by controls responsive to the fluid pressure as applied in the brake system for the tractor. In the past, the electric brake systems have utilized a variable resistance element, such as a wire wound resistor, by which the current to the electric brakes was varied in accordance with the amount of resistance placed in series circuit with the electric brake coil. Thus with such systems the high magnitude electric current is carried by the resistance element. It is an object of the present invention to provide an improved control system for electric brakes utilizing solid state controls.

It is desirable in a tractor trailer combination of the above described type that the electric brake system of the trailer be subject not only to the same foot pedal control as the fluid brake system of the tractor but be independently actuable, manually as by a hand lever. By this means the brakes of the trailer, if desired, can be actuated without actuating the brakes of the tractor. Thus, in certain conditions, i.e., going downhill, it may be desirable that a certain amount of drag be applied to the tractor trailer combination solely through the brakes of the trailer. This can be accomplished by the hand control. However, it is additionally desirable that the effect of the hand control and foot control not be additive and hence, that the hand control can be overridden by the foot control actuating both the brake system for the tractor and the brake system for the trailer. For example, if the hand control has been set to provide a preselected amount of braking on the trailer, upon application of the foot control additional braking of the trailer will occur only after the originally preselected braking magnitude set by the hand control has been reached. This feature is important in preventing additional braking on the trailer due to actuation of the foot control to partially brake the tractor. It is likewise desirable that the converse be true and that with a preselected amount of braking being applied by the foot control, the hand control will be effective to cause increased braking in the trailer only after the hand control has reached a position at which the braking effect from the foot control would have been equaled if the hand control were used alone.

In view of the above, it is an object of the present invention to provide a control system for electric brakes utilizing both a hand and a foot control and it is another object to provide such a control system in which the effect of the hand and foot control is not cumulative.

It is still another object of the present invention to provide a control system for electric brakes having hand and foot controls in which with the hand control set to provide a preselected amount of braking the foot control is ineffective to increase the braking until the foot control has been actuated to a point at which this preselected level would have been reached by the foot control alone.

It is still another object of the present invention to provide a control system for electric brakes having both hand and foot controls in which the hand control is ineffective to cause increased braking until the hand control has been actuated to a point at which the same magnitude of the braking applied by the foot control would have been reached by actuation of the hand control alone.

It is still another object of the present invention to provide a novel control system for electric brakes for use with a trailer and having a first control operative with the actuating mechanism for the brake system of the tractor and having a second control operative separately from that actuating mechanism.

In addition to the above, since the present invention provides for a control system utilizing solid state components, it is another object of the present invention to provide short circuit protection for the solid state components and specifically for protection resulting from short circuiting of the lines leading from the tractor to the coils of the electric brakes in the trailer. Therefore, it is another object of the present invention to provide a novel system for electric brake control utilizing solid state controls in which the solid state components are provided with short circuit protection.

It is still another object of the present invention to provide a control system for electric brakes utilizing solid state components in which the solid state components are protected from damage due to short circuiting of the electrical lines leading to the coils of the electric brakes.

Other objects, features, and advantages of the present invention will become apparent from the subsequent description and the appended claims, taken in conjunction with the accompanying drawings, in which:

FIGURE 1 is a pictorial drawing of a tractor trailer combination generally depicting portions of the control system for electric brakes of the present invention;

FIGURE 2 is an electrical schematic diagram of the solid state control circuit of FIGURE 1;

FIGURE 4 is a circuit diagram depicting a different modification of a portion of the circuit of FIGURE 2 for a modified control circuit;

FIGURE 5 is a circuit diagram of a still different control circuit; and

FIGURE 5A is a schematic diagram depicting the separate brake systems for the tractor and trailer.

Figure 3:
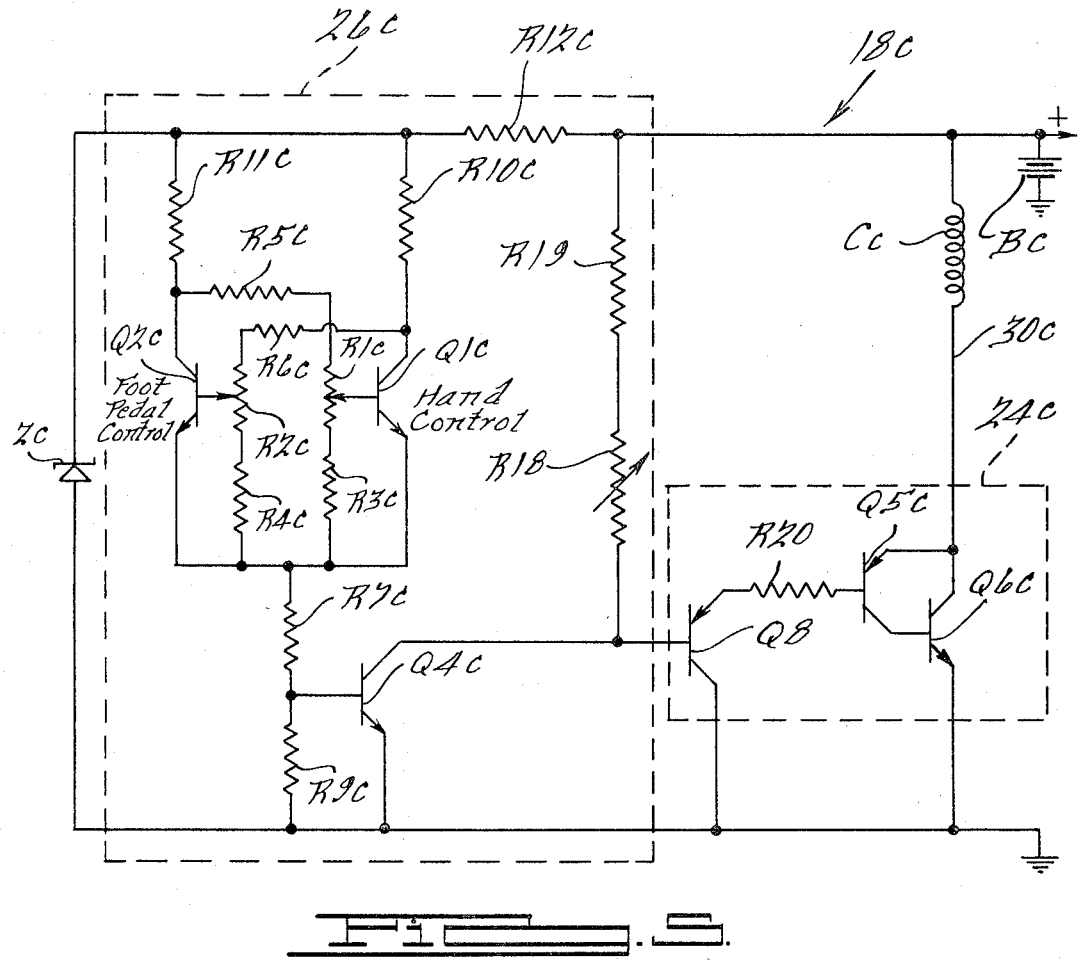
FIGURE 3 is a circuit diagram depicting a modified portion of the circuit of FIGURE 2 for a modified control circuit.
Figure 3A:
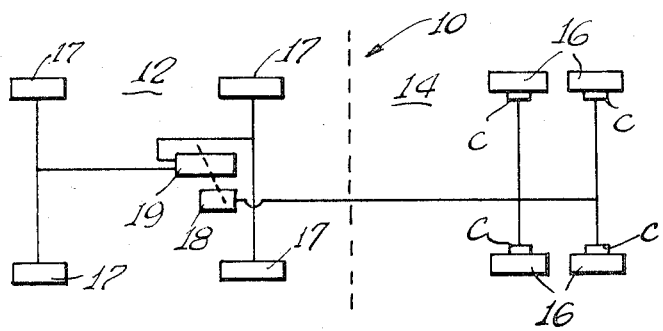

Looking now to the drawings, a tractor trailer combination is generally indicated by the numeral 10 and includes a tractor 12 and a trailer 14 with the wheels 16 of the trailer 14 being equipped with electrically actuated brakes which are part of an electric brake system including an electric coil (shown diagrammatically) which is electrically connected by a pair of wires to a control circuit 18 located at the driver's compartment of the tractor 12. The specific details of the control circuit 18 and the connection of the coil C is shown in the schematic diagram of FIGURE 2. Wheels 17 of the tractor 12 are controlled by an independent braking system (see FIGURE 5A) which can be either hydraulically or pneumatically actuated by actuating apparatus 19 (which can include a master cylinder, etc.).

The apparatus of FIGURE 2 is connected to a battery B which has a positive ground with conductors 20 and 22 connected to the positive and negative terminals, respectively, of the battery B. The circuit 18, in general, is comprised of a power control section 24, a signal control section 26, and a short circuit control section 28.

The power control section 24 controls the amount of electric power or current transmitted to the coil C. The signal control section 26 is responsive to hand and foot controls in the tractor 12 to provide signals controlling the power control section 24 while the short circuit control section 28 prevents damage to the solid state elements in the power control section 24 resulting from a short circuit in the conductors leading to the coil C.

The signal control section 26 includes a pair of NPN type transistors, Q1 and Q2, which have base electrodes connected to control potentiometers R1 and R2, respectively. The transistors Q1 and Q2 are interconnected in a manner to be described with the transistor Q1 being associated with a hand control and transistor Q2 associated with a foot pedal control. The hand control can be in the form of a movable dial or lever located in the driver's compartment of the tractor 12 the lever being connected to the wiper of potentiometer R1 such that its position along the potentiometer R1 can be varied whereby the output of the transistor Q1 will be varied. The wiper of potentiometer R2 is connected to the actuating mechanism for the fluid pressure brake system for the tractor 12 with its position being varied in accordance with the pressure applied to the fluid brake system of the tractor 12. As will be seen, the magnitude of braking current to the coil C will be directly related to the magnitude of the current signal from the signal control section 26 as determined by the combined outputs of the transistors Q1 and Q2.

The signal control section 26 can be operated such that either the hand or foot pedal control can be actuated independently of each other. Considering now that a given amount of braking effort is desired at the trailer brakes, i.e., a given magnitude of braking current to the coil C, for hand control alone, the wiper for the potentiometer R1 will be located at a selected position whereby the current signal will be at a given magnitude; likewise, for foot pedal control alone, the wiper of the potentiometer R2 will be located at a selected position to provide the same magnitude of signal current and, hence, same magnitude of braking current to the coil C. The circuit of the signal control section 26 has the hand control and foot pedal control circuits interconnected such that the effect of simultaneous actuation of hand and foot pedal controls is not cumulative. Assume now that the foot pedal control is not actuated and the wiper for potentiometer R1 is in a selected position to provide for a selected magnitude of signal current from Q1 alone and, hence, for a selected magnitude of current to coil C. Assume also that to provide the same magnitude of signal current from Q2 alone the wiper of potentiometer R2 must be in a similar selected position. The circuit is such that actuation of the foot pedal control and, hence, movement of the wiper of potentiometer R2 will be ineffective to increase the magnitude of signal current and, hence, braking current to the coil C until it reaches substantially that same selected position at which Q2 alone would provide signal current of the same magnitude. The reverse is also true, i.e., where the foot pedal control is operated first and additional braking is sought to be added by the hand control. As previously noted, in this way the hand control can be set to provide for a given amount of braking in the trailer 14; as the braking system in the tractor 12 is actuated via the foot pedal, no additional braking will be experienced in the trailer 14 until the wiper for the potentiometer R2 reaches the point equivalent to the selected point of the wiper of potentiometer R1. This interaction prevents a cumulative effect as to the braking current provided to the coil C and, hence, prevents brakes of the trailer 14 from becoming unintentionally locked as the result of set braking by the hand control (Q1) and additional braking as the result of actuation of the foot pedal control.

The above interaction is provided by the circuitry of the signal control section 26 which will now be described in greater detail. The bases of the transistors Q1 and Q2 are connected to the wipers of the potentiometers R1 and R2, respectively. The one end of the potentiometer R1 is connected to the emitter of the transistor Q1 via a dropping resistor R3 while the emitter of the transistor Q2 is similarly connected to one end of its potentiometer R2 by means of a dropping resistor R4. The other end of the potentiometer R1 is connected to the collector of transistor Q2 via dropping resistor R5 while the other end of the potentiometer R2 is connected to the collector of the transistor Q1 via a dropping resistor R6. The emitters of transistors Q1 and Q2 are connected together at their juncture with resistors R3 and R4 and are thence connected to the negatively connected conductor 22 via a dropping resistor R7, the resistance of a potentiometer R8 and another dropping resistor R9. The collectors of transistors Q1 and Q2 are connected to resistors R10 and R11, respectively, which have their opposite ends connected together. The juncture of resistors R10 and R11 is connected to the positively connected conductor 20 through the emitter-collector circuit of a transistor Q3 located in the short circuit control section 28; a dropping resistor R12 is connected in series with the positive conductor 20.

Considering a situation in which neither the hand control nor foot pedal control is actuated, the wipers of the potentiometers R1 and R2 will be in selected conditions in which the total output from the transistors Q1, Q2 will be at zero or at some selected minimium. If it is desired to effectuate braking only by the hand control, the wiper for the potentiometer R1 is moved in a direction whereby the base of transistor Q1 is made more positive resulting in greater conduction through transistor Q1 and, hence, resulting in a signal current through the resistor R7, potentiometer R8 and resistor R9 of a given magnitude depending upon the bias set by the wiper at that position. At the same time, the collector of the transistor Q2 will be made more positive; this has an effect to be described. Assuming again that neither the hand nor foot pedal control is actuated, in braking by food pedal actuation the wiper for potentiometer R2 will be moved in a direction such that the base of transistor Q2 will be more positive resulting in increased conduction through the collector emitter circuit of the transistor Q2 and, hence, resulting in a signal current having a magnitude determined by the magnitude of the fluid pressure applied by the foot pedal in the brake system for the tractor 12. Again note that since the base of transistor Q2 is connected to the collector of the transistor Q1, as the base of transistor Q2 becomes more positive the collector of the transistor Q1 will become more positive. Assuming now that neither the hand control nor foot pedal control has been actuated and it is desired that the brakes of the trailer 14 be partially energized, then the hand control can be operated to move the wiper of the potentiometer R1 to a position where the desired degree of braking is effectuated; at this position the signal current from the transistor Q1 is of a selected magnitude and hence, the braking current to coil C is of a selected magnitude. Assuming that in addition to actuation of the hand control it is desired to apply braking to the tractor 12 by means of the foot pedal control, i.e., in conjunction with the brake system of the tractor 12 the wiper for R2 will be moved in a direction to render the base of the transistor Q2 more positive. However, initial movement of the wiper of the potentiometer R2 will not cause conduction because of the positive potential at the collector of transistor Q2 by the connection to the base circuit of the transistor Q1. Until the point is reached at which the bias to the collector of Q2 from Q1 is overcome the actuation of the foot pedal control will be ineffective to cause any increase in the magnitude of the signal current. However, when the wiper of the potentiometer R2 reaches a point at which the bias at the base of the transistor Q2 is sufficient to overcome the added bias at the collector of the transistor Q2, then further movement of the wiper of potentiometer R2 increasing bias at the base of transistor Q2 will result in an increase in magnitude of the signal current and hence, an increase in the magnitude of the braking current to the coil C. At the point at which the wiper of potentiometer R2 will begin to provide an increase in signal current the transistor Q2 if operative alone, would provide the same amplitude of signal current as was provided by Q1. Since the transistors Q1 and Q2 are similarly interconnected the converse will occur if the foot pedal control is initially actuated and additional braking is attempted to be applied by the hand control. Note that upon release of the foot pedal control and upon return of the wiper of potentiometer R2 back to its original deactuated position, the hand control Q1 still being in its selected position will once again maintain the control signal current at the same magnitude as originally selected to provide for the same magnitude of braking current to the coil C.

The signal current is conducted through the resistance of potentiometer R8 which has its wiper connected to the base of a transistor Q4, which has its emitter connected to the negative conductor 22. The collector of transistor Q4 is connected via a biasing resistor R13 to the base of a power control transistor Q5. The power control transistor Q5 is located in the power control section 24. The transistor Q4 is normally biased to an off condition and will be conductive upon the actuation of either the hand control or foot pedal control resulting in a control signal flowing as a result of conduction of transistor Q1 and/or Q2. The signal current through the resistance of potentiometer R8 will bias transistor Q4 to conduct current through its collector-emitter circuit having a magnitude varying in accordance with the magnitude of the signal applied to its base.

The power control transistor Q5 is electrically connected to a power transistor Q6 which has its emitter-collector circuit serially connected to one side of the coil C with the emitter being connected to the negative conductor 22 and with the other side of the coil C being connected to the positive conductor 20. The collector of the transistor Q5 is connected to the base of the power transistor Q6 while the emitter of the transistor Q5 is connected to the collector of the power transistor Q6. The transistors Q4, Q5 and Q6 are normally off; upon the transistor Q4 being rendered conductive as by an output signal from the transistor Q1 and/or Q2, the power control transistor Q5 will be rendered conductive and it in turn will render conductive the power transistor Q6. The result is that the transistor Q6 will conduct current to the coil C having a magnitude varying in accordance with the magnitude of the signal applied to the base of the transistor Q4. Thus the manipulation of the hand control or foot pedal control which results in variations in the signal current magnitude, will also result in a corresponding variation in magnitude of power current to the coil C.

Looking now to FIGURE 1, it will be noted that the coil C is located at a position substantially removed from the control circuit 18. As noted, one end of the coil C is connected to the positively connected conductor 20, which is grounded, while the other end of the coil C is connected to the collector of the power transistor Q6 via a conductor 30. If the conductor 30 as the result of wear due to vibration, etc., of the vehicle becomes grounded to the vehicle chassis, full battery voltage will then be applied across the power transistor Q6 whereby Q6 could be destroyed. In order to prevent power transistor Q6 from burning out, the short circuit control section 28 has been provided.

In the short circuit control section 28, transistor Q3, as previously noted, is in series with the signal control section 26 and is normally in a conductive condition and hence operation of the signal control section 26 will normally not be affected by the transistor Q3. The base of transistor Q3, which is of the PNP type, is connected to the emitter of an NPN type transistor Q7, which has its collector connected to the low side of the resistor R12 and has its emitter connected to the base of transistor Q3. The base of transistor Q7 is connected to the negative side of battery B through a biasing resistor R14. At the same time, the base of transistor Q7 is connected to the low potential side of the coil C via a series circuit including a resistor R15. At the same time the collector of transistor Q3 is connected to a bias resistor R16 which is connected to one end of a tapped resistor R17. The tap of resistor R17 is connected both to the emitter of transistor Q7 and the base of transistor Q3 with the other end of resistor R17 being connected to the anode of a diode D having its cathode connected to the low voltage end of the coil C.

In operation, the transistor Q3 is normally "on" and the transistor Q7 is normally "off." When the control circuit 18 is not actuated and hence no current flows through the power transistor Q6, Q3 is biased on with its base being connected negatively relative to its emitter via the resistors R17, R16 and the signal control section 26. Under this condition diode D blocks out the positive potential at conductor 30 and transistor Q3 remains conductive. When the control circuit 18 is actuated to cause conduction of current to the power transistor Q6 and to the coil C, the transistor Q3 is still maintained conductive and will actually be placed in saturation since the diode D will connect the negative potential then at conductor 30 to the base of the transistor Q3. In the event that a short circuit develops by conductor 30 shorting to the positive ground, the impedance provided by the coil C would be removed from the series path with the collector-emitter electrodes of the power transistor Q6 with the result that the power transistor Q6 could be burned out. This is prevented, however, by the action of the transistor Q7. Assuming that conductor 30 has shorted to ground, the conductor 30 becomes positive providing a positive bias at the base of the transistor Q7 causing that transistor to be rendered conductive. With transistor Q7 conductive, the base of the transistor Q3 is rendered positive resulting in transistor Q3 being rendered non-conductive. With transistor Q3 non-conductive, the signal control section 26 is then rendered non-conductive whereby the transistor Q4 is turned off, the power control transistor Q5 is turned off resulting in the power transistor Q6 being turned off. With the power transistor Q6 turned off the short circuit current will not be transmitted therethrough and the transistor Q6 will not be burned out. Resistors R15 and R14 in the base bias circuit for the transistor Q7 are selected to differentiate from a condition in which no short circuit condition occurs and the transistor Q6 is off and the condition in which the conductor 30 is shorted to ground and full positive potential appears at the conductor 30. There is a difference in potential between the two different conditions and this will be sensed by the network comprising the resistors R15 and R14 so as to provide conduction of the transistor Q7 under short circuit conditions and non-conduction of the transistor Q7 under normal operating conditions.

A zener diode Z is connected between the negative conductor 22 and the low side of resistor R12 and provides voltage regulation for the circuitry energized between those two points.

The power transistor Q6 can be protected in a negative grounded system as shown in FIGURE 3. In FIGURE 3 a portion of a circuit similar to control circuit 18 of FIGURE 2 is shown in which components serving similar functions as that shown in the circuit diagram of FIGURE 2 are given the same designation with the addition of the letter subscript "a."

Looking now to FIGURE 3, the power transistor Q6a is serially connected to the coil Ca in the system in which the negative conductor 22a is connected to ground and the positive conductor 20a is connected to the plus side of the battery Ba. It can readily be seen that, in the event of a short circuit in either of the lead wires which would extend from the coil Ca and along trailer 14 to the tractor 12, no damage would occur to the power transistor Q6a since the battery potential would not be impressed across Q6a in the circuit orientation as shown in FIGURE 3. Thus with the circuit of FIGURE 3, the short circuit control section 28 shown in FIGURE 2 could be eliminated.

Looking now to FIGURE 4, a circuit modification similar to that shown in FIGURE 3 for a positive ground system is shown with like components being similarly designated with the addition of a letter subscript "b." There the power transistor Q6b is serially connected to the coil Cb; however, in this case the emitter of the transistor Q6b is connected to one end of the coil Cb with the other end of the coil Cb being connected to the negative of the battery Bb, and with the collector of the transistor Q6b being connected to the positive side of the battery Bb or to ground. Note that the conductor 30b connecting the emitter to the coil Cb can be grounded and again the battery Bb would not be connected across transistor Q6b and no damage would occur to the power transistor Q6b. Thus, with the circuit as shown in FIGURE 4, the short circuit control section 28 as shown in FIGURE 2 could be eliminated.

Looking now to FIGURE 5, a modified circuit similar to the circuit of FIGURE 2 is shown. In the circuit of FIGURE 5 components similar to and serving similar functions to like components in the circuit of FIGURE 1 have been given the same numeral designation with the addition of the letter subscript "c." In FIGURE 5 the short circuit control section 28 of FIGURE 1 is not utilized with short circuit protection being provided by utilizing a circuit arrangement similar to that shown in FIGURE 3. In the circuit of FIGURE 2 the potentiometer R8 provides a means for adjustably controlling the point at which conduction of transistor Q4 can be initiated and hence functions as a calibration device whereby the circuit 18 can be adapted to accommodate the requirements of different brake applications. However, changes in the position of the wiper for potentiometer R8 will also change the operating characteristics of transistor Q5 and hence of transistor Q6. In the circuit 18c of FIGURE 5, potentiometer R8 and resistor R13 have been eliminated and calibration for different brake applications is provided by the circuit comprising transistor Q8 of the p-n-p type, variable resistor R18, and resistors R19 and R20. Transistor Q8 is connected between transistors Q4c and Q5c with its base connected to the collector of transistor Q4c and its emitter connected to the base of transistor Q5c via the dropping resistor R20. The base of Q8 is connected to the positive side of the battery Bc through the series circuit consisting of resistor R19 and variable resistor R18 while the collector of Q8 is connected to ground. The transistor Q8 will be rendered more conductive as its base becomes more negative. As transistor Q4c conducts more, the base of Q5c becomes more negative resulting in increased conduction which in turn causes Q6c to conduct more. In this way the current to the coil Cc is controlled. By adjusting the variable resistor R18, the conduction of transistor Q8 can be controlled and can be set to accommodate the characteristics of various brake systems under different conditions. For example, one system may require for optimum operation that the maximum brake current to coil Cc be limited to a selected magnitude for a selected pressure in the hydraulic system. The resistor R18 can be adjusted to provide saturation of transistor Q8 at the selected hydraulic pressure whereby the maximum current to the coil Cc is the selected magnitude.

What is claimed is:

1. A control circuit for controlling the actuation of electric brakes for a wheeled vehicle in accordance with the operation of a brake actuating device by the vehicle operator with the brakes including a brake coil member comprising: output circuit means for providing energizing current to the brake coil member varying in magnitude in accordance with the variations in the magnitude of an electrical control signal, and signal circuit means for providing said control signal to said output circuit means and actuable for selectively varying the magnitude of said control signal, said output circuit means comprising a first solid state controlled conduction device for controllably transmitting the energizing current to the brake coil member in accordance with said control signal, said signal circuit means comprising a second solid state controlled conduction device for providing said control signal and for varying the magnitude of said control signal in accordance with variations in magnitude of a preselected electrical characteristic, and means electrically connected to said second controlled condution device for providing the variations in magnitude of said preselected electrical characteristic in response to variations caused by movement of the brake actuating device by the operator.

2. The control circuit of claim 1 including connecting means electrically connecting said first controlled conduction device to the brakes and protection means preventing short circuit current from passing through said first controlled conduction device as the result of a short circuit in said connecting circuit means.

3. The control circuit of claim 2 with said protection means comprising means for sensing the current through said first device being connected to said first device for rendering said first device non-conductive responsively to a selected magnitude of current whereby said first device is protected from damage resulting from a short circuit condition.

4. The control circuit of claim 1 being operable from a power supply having one side connected to ground and with said first solid state controlled conduction device controllably transmitting the current from the power supply to the brake coil member, said first device having a pair of principal electrodes for transmitting the current to the brake coil member and connecting circuit means electrically connecting said principal electrodes of said first device to the brake coil member and to the power supply with one of said principal electrodes being connected to ground whereby a grounded short at the other of said principal electrodes will not harm said first device.

5. The control circuit of claim 4 with said connecting circuit means connecting said principal electrodes, said coil and the power supply generally in a series circuit.

6. The control circuit of claim 1 with said signal circuit means comprising two independently actuable control circuit means each actuable for providing said control signal.

7. The control circuit of claim 6 with said two control circuit means being interconnected for providing a common said control signal.

8. The control circuit of claim 6 with each of said control circuit means being interconnected with the actuation of both at the same time having a non-cumulative effect on the magnitude of said control signal.

9. The control circuit of claim 1 further including adjustable circuit means being connected between said output circuit means and said signal circuit means and being selectively adjustable for limiting the maximum current from said output circuit means to selected magnitudes.

10. The control circuit of claim 9 further including a third solid state controlled conduction device and a variable impedance element connected to one of its electrodes for varying the conductive characteristics of said third device.

11. The control circuit of claim 10 with said variable impedance element being a variable resistor selectively adjustable for varying said maximum current to said selected magnitudes.

12. In a wheeled vehicle having one set of electrically actuated brakes and a control circuit for controlling the actuation of the electric brakes and having another set of brakes actuated by a system separate from said control circuit with the electric brakes including a brake coil member comprising: output circuit means for providing energizing current to the brake coil member varying in magnitude in accordance with the variations in the magnitude of an electrical control signal, and signal circuit means for providing said control signal to said output circuit means and actuable for selectively varying the magnitude of said control signal, said signal circuit means comprising two independently actuable control circuit means each actuable for providing said control signal, first actuating means connected to one of said control circuit means for actuating said one of said control circuit means simultaneously with the actuation of the system for the other set of brakes whereby both sets of brakes will be simultaneously actuated, second actuating means connected to the other of said control circuit means for actuating said other of said control circuit means independently of the system for the other set of brakes whereby only the one set of brakes will be actuated.

13. The control circuit of claim 12 with each of said control circuit means being interconnected with the actuation of both at the same time having a non-cumulative effect on the magnitude of said control signal.

14. The control circuit of claim 12 with said two control circuit means being interconnected for providing a common said control signal.

15. The control circuit of claim 14 with said output circuit means comprising a solid state controlled conduction device for controllably transmitting the current to the one set of brakes.

16. The control circuit of claim 15 including connecting circuit means electrically connecting said device to the one set of brakes and means preventing short circuit current from passing through said device as the result of a short circuit in said connecting circuit.

17. The control circuit of claim 12 with one of said control circuit means comprising a first controlled conduction device and the other said control circuit means comprising a second controlled conduction device.

18. The control circuit of claim 17 with each of said first and second controlled conduction devices having three electrodes and with said two control circuit means being interconnected with two of said electrodes of said first controlled conduction device being connected to two of said electrodes of said second controlled conduction device with the actuation of both said signal circuit means at the same time having a non-cumulative effect on the magnitude of said control signal.

19. The control circuit of claim 18 with said three electrodes being a collector, emitter and a base with said two control circuit means having dissimilar ones of said two of said electrodes connected together.

20. The control circuit of claim 18 with said three electrodes being a collector, emitter and a base with the bases of said first and second devices being connected to the collectors of said second and first devices, respectively.

21. The control circuit of claim 20 with a pair of potentiometers connecting each of the bases to each of the collectors.

22. The control circuit of claim 21 with said output circuit means comprising a third solid state controlled conduction device for controllably transmitting the current to the one set of brakes.

23. The control circuit of claim 22 with said third device having a pair of principal electrodes and a control electrode and with means connecting the output of said first and second devices to said control electrode whereby the current through said principal electrodes is controlled by said first and second devices.

24. The control circuit of claim 23 being operable from a power supply having one side connected to ground and comprising connecting circuit means electrically connecting said principal electrodes of said third device to said coil member and to the power supply with one of said principal electrodes being connected to ground whereby a grounded short at the other of said principal electrodes will not harm said third device.

25. The control circuit of claim 24 with the wheeled vehicle being a tractor and a trailer and with the one set of brakes being on the trailer and the other set on the tractor and with the other set being fluid actuated and with said connecting circuit means including a pair of conductors connected to opposite sides of said coil.

26. The control circuit of claim 23 further including protection means preventing short circuit current from passing through said third device, said protection means connected to said control electrode of said third device and comprising sensing means for sensing the current through said principal electrodes of said third device for rendering said third device non-conductive responsively to a selected magnitude of current whereby said third device is protected from damage resulting from a short circuit condition.

27. The control circuit of claim 26 with the wheeled vehicle being a tractor and a trailer and with the one set of brakes being on the trailer and the other set on the tractor and with the other set being fluid actuated and with said sensing means connected to said signal circuit means for causing said signal circuit means to provide said control signal with a magnitude rendering said third device non-conductive.

28. The control circuit of claim 27 with said potentiometers having movable wipers and with the positions of said wipers determining the magnitude of said control signal.

29. The control circuit of claim 23 further including adjustable circuit means being connected between said output circuit means and said signal circuit means and being selectively adjustable for limiting the maximum current from said output circuit means to selected magnitudes.

30. The control circuit of claim 29 further including a fourth solid state controlled conduction device and a variable impedance element connected to one of its electrodes for varying the conductive characteristics of said fourth device.

31. The control circuit of claim 30 with said variable impedance element being a variable resistor selectively adjustable for varying said maximum current to said selected magnitudes.

References Cited

UNITED STATES PATENTS

| | | | |
|---|---|---|---|
| 2,169,668 | 8/1939 | Thomas | 188—3 |
| 3,048,976 | 8/1962 | Grigsby et al. | 303—7 XR |
| 3,131,975 | 5/1964 | Smith et al. | 303—20 XR |
| 3,311,787 | 3/1967 | Gunderman | 317—33 |
| 3,328,739 | 6/1967 | McInnis et al. | 338—96 |
| 3,371,253 | 2/1968 | Hubbard | 317—148.5 XR |

MILTON BUCHLER, *Primary Examiner.*

J. J. McLAUGHLIN, *Assistant Examiner.*

U.S. Cl. X.R.

303—7, 20; 317—123, 130, 148.5